(12) United States Patent
Miki et al.

(10) Patent No.: US 8,570,961 B2
(45) Date of Patent: Oct. 29, 2013

(54) COMMUNICATION CONTROL METHOD AND ITS APPLIED BASE STATION

(75) Inventors: Nobuhiko Miki, Yokohama (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 394 days.

(21) Appl. No.: 12/672,689

(22) PCT Filed: Aug. 13, 2008

(86) PCT No.: PCT/JP2008/064541
§ 371 (c)(1),
(2), (4) Date: Jun. 4, 2010

(87) PCT Pub. No.: WO2009/022707
PCT Pub. Date: Feb. 19, 2009

(65) Prior Publication Data
US 2011/0182246 A1    Jul. 28, 2011

(30) Foreign Application Priority Data

Aug. 14, 2007   (JP) ................. 2007-211601

(51) Int. Cl.
*H04W 4/00* (2009.01)
*H04W 72/00* (2009.01)

(52) U.S. Cl.
USPC ........................................ 370/329; 455/450

(58) Field of Classification Search
USPC ....................................................... 370/329
See application file for complete search history.

(56) References Cited

U.S. PATENT DOCUMENTS

| | | | |
|---|---|---|---|
| 6,556,550 B1 * | 4/2003 | Rasanen ................. | 370/329 |
| 7,634,289 B2 * | 12/2009 | Gervais et al. .......... | 455/522 |
| 7,821,983 B2 * | 10/2010 | Wang et al. ............ | 370/328 |
| 7,822,420 B1 * | 10/2010 | Schulz .................. | 455/447 |
| 7,904,778 B2 * | 3/2011 | Yamada et al. .......... | 714/749 |
| 8,054,786 B2 * | 11/2011 | Wu et al. .............. | 370/329 |
| 8,145,271 B2 * | 3/2012 | Ishii .................... | 455/561 |
| 8,432,883 B2 * | 4/2013 | Ishii .................... | 370/343 |
| 2002/0082020 A1 * | 6/2002 | Lee et al. .............. | 455/450 |
| 2003/0074476 A1 * | 4/2003 | Kim et al. ............. | 709/246 |
| 2003/0115362 A1 * | 6/2003 | Tarvainen et al. ....... | 709/245 |
| 2004/0072565 A1 * | 4/2004 | Nobukiyo et al. ....... | 455/436 |
| 2004/0187069 A1 * | 9/2004 | Pietraski et al. ........ | 714/786 |
| 2004/0190541 A1 * | 9/2004 | Zhang .................. | 370/431 |
| 2007/0177553 A1 * | 8/2007 | Frederiksen et al. ..... | 370/335 |
| 2009/0219875 A1 * | 9/2009 | Kwak et al. ............ | 370/329 |
| 2010/0278083 A1 * | 11/2010 | Kwak et al. ............ | 370/280 |

FOREIGN PATENT DOCUMENTS

| | | |
|---|---|---|
| EP | 1 976 317 A1 | 10/2008 |
| WO | 2007/083569 A1 | 7/2007 |

OTHER PUBLICATIONS

International Search Report w/translation from PCT/JP2008/064541 dated Nov. 25, 2008 (2 pages).
Written Opinion from PCT/JP2008/064541 dated Nov. 25, 2008 (4 pages).
3GPP TR 25.814 v7.1.0; "Physical layer aspects for evolved Universal Terrestrial Radio Access (UTRA)"; Sep. 2006 (132 pages).

* cited by examiner

*Primary Examiner* — Guang Li
(74) *Attorney, Agent, or Firm* — Osha Liang LLP

(57) ABSTRACT

A disclosed communication control method includes determining a number of bits for transmitting downlink shared data channel information based on one or both of a number of users and a traffic amount and generating a signal for the downlink shared data channel information to be transmitted with the determined number of bits.

6 Claims, 2 Drawing Sheets

COMMUNICATION CONTROL METHOD AND ITS APPLIED BASE STATION

TECHNICAL FIELD

The present invention relates to a communication control method for controlling transmissions of downlink control channels and its applied base station.

BACKGROUND ART

In the framework of 3GPP (Third Generation Partnership Project), it is designed that downlink shared data information, uplink shared data information, paging information, random access channel information, dynamic broadcast channel information, power control commands and/or others are transmitted in downlink control channels.

DISCLOSURE OF INVENTION

Problem to be Solved by the Invention

Among the above information items, the downlink shared data information must be transmitted with a large number of bits while the uplink shared data information can be transmitted in a smaller number of bits than the downlink shared data information. In this manner, if these information items are transmitted in mutually different numbers of bits, there would be at most six kinds of bit sizes.

In such a situation, a mobile station has to perform blind detection on all the bits in order to read the information items. Also, if the same number of bits or the same bit size is applied for the different information items for easier readings, the maximum number of bits, that is, the maximum bit size, must be used uniformly over all the information items. One way to achieve this is through increase in overhead or addition of dummy bits, which may lead to unnecessary consumption of radio resources. In addition, if mobile stations use a number of methods corresponding to the kinds of bit sizes to read the information items, the mobile stations would have complicated reception operations, which may cause complicated arrangements of the mobile stations.

Thus, one object of the present invention is to provide a method for reducing the kinds of different bit sizes applied for different types of information items transmitted in downlink control channels and its applied base station.

Means for Solving the Problem

In order to achieve the above object, a first aspect of the present invention relates to a communication control method, including: determining a number of bits for transmitting downlink shared data channel information based on one or both of a number of users and a traffic amount; and generating a signal for the downlink shared data channel information to be transmitted with the determined number of bits.

A second aspect of the present invention relates to a base station, including: a scheduler configured to determine a number of bits for transmitting downlink shared data channel information based on one or both of a number of users and a traffic amount.

Advantage Of The Invention

According to the present invention, there are provided a method for reducing bit size kinds applied for different types of information items transmitted in downlink control channels and its applied base station.

LIST OF REFERENCE SYMBOLS

Figure 1:
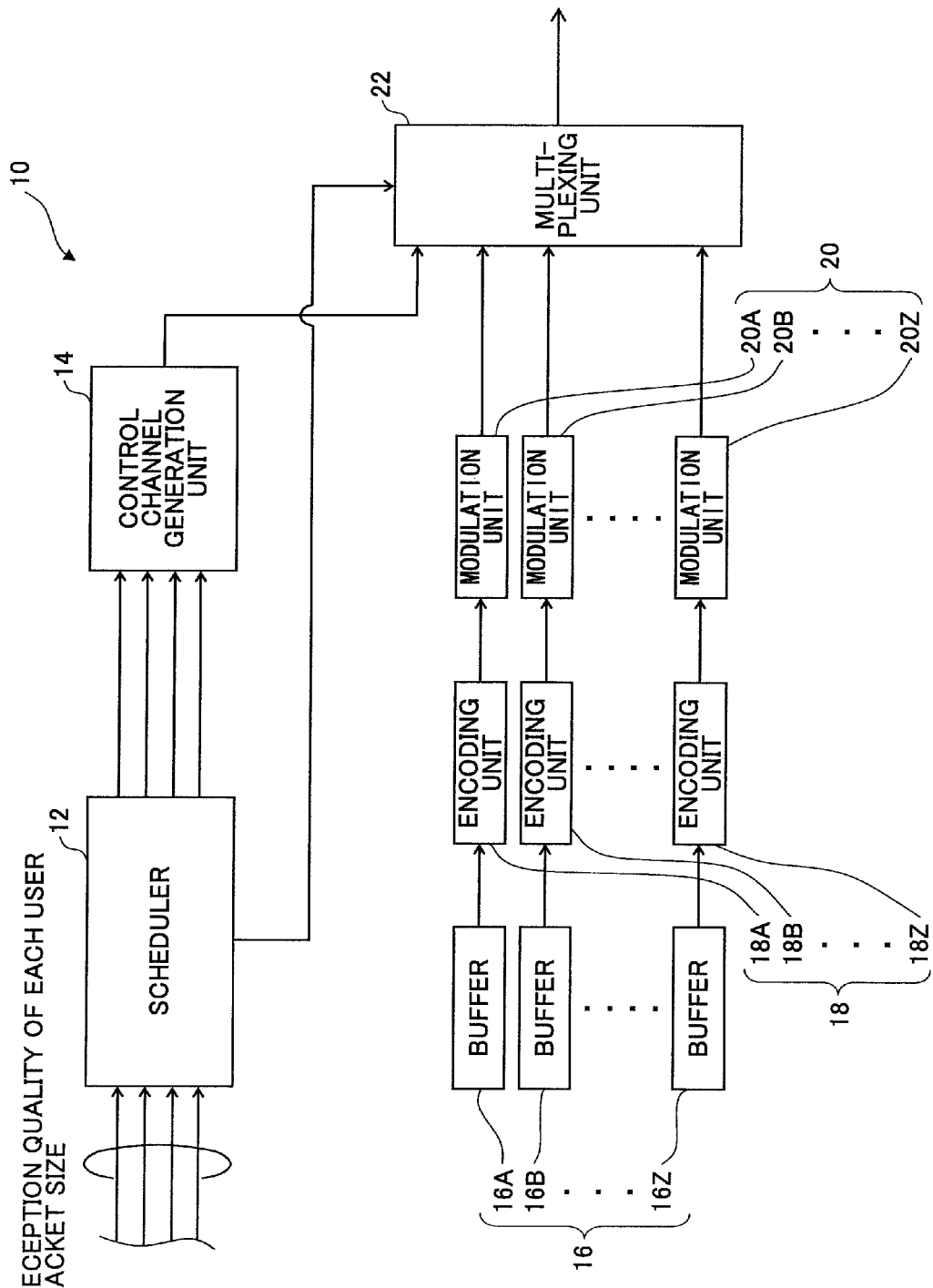
FIG. 1 is a schematic block diagram illustrating an arrangement of a base station according to an embodiment of the present invention.

10: mobile station
12: scheduler
14: control channel generation unit
16: buffer
18: encoding unit
20: modulation unit
22: multiplexing unit

BEST MODE FOR CARRYING OUT THE INVENTION

Embodiments of the present invention are described below with reference to the accompanying drawings.

[First Embodiment]

A base station according to the first embodiment of the present invention is described.

FIG. 1 is a schematic block diagram illustrating an arrangement of a base station according to the present invention. As illustrated, a base station 10 includes a scheduler 12, a control channel generation unit 14, buffers 16, encoding units 18, modulation units 20 and a multiplexing unit 22.

The scheduler 12 receives incoming information items such as reception quality for each user, a packet size and a traffic amount and determines how radio resources are to be assigned to the users based on the received information items. Also, the scheduler 12 determines how many users (mobile stations) are to be multiplexed based on the information items. In addition, the scheduler 12 selects the number of bits required to transmit downlink shared data channel information based on one or both of the number of users and the traffic amount. For example, the scheduler 12 can select an optimum number of bits for transmitting the downlink shared data channel information (for example, 80 bits) or an optimum number of bits for transmitting the uplink shared data channel information (which corresponds to a number of bits smaller than the optimum number of bits for transmitting the downlink shared data channel information, for example, 40 bits).

In one embodiment, the optimum number of bits for transmitting the downlink shared data channel information may be determined based on one of downlink resource assignment information indicative of resource blocks assigned to the users, user IDs and transport format information indicative of data modulation schemes and/or others. In another embodiment, in addition to these information items, the optimum number of bits may be determined in further consideration of distributed transmission information, uplink transmission power control information, retransmission request signal error detection type of hybrid ARQ-related information and/or others. In a still further embodiment, the optimum number of bits may be determined in consideration of frequency bandwidths.

In addition, the scheduler 12 supplies information indicative of the determined assignment (assignment information) and the selected number of bits (bit size information) to the control channel generation unit 14 and supplies information indicative of the number of users to be multiplexed (multiplexing information) to the multiplexing unit 22.

The control channel generation unit 14 generates control channels based on the assignment information and the bit size information received from the scheduler 12 and supplies the generated control channels to the multiplexing unit 22.

If the scheduler 12 determines that the downlink shared data channel information is to be transmitted in a number of bits for transmitting the uplink shared data channel information, the downlink shared data channel information would be transmitted in the same number of bits as the uplink shared data channel information. In order to differentiate between these information items, it is preferred that the downlink shared data channel information include information indicating that the downlink shared data channel information is transmitted in the number of bits for transmitting the uplink shared data channel information. In addition, other information may be added to the uplink shared data channel information at the same time for more reliable differentiation.

User information to be transmitted to each user and stored in the buffers 16 (16A, 16B, . . . , 16Z) provided for the respective users is supplied to the encoding units 18A, 18B, . . . , 18Z corresponding to the buffers 16A, 16B, . . . , 16Z and encoded at the encoding units 18A, 18B, . . . , 18Z. The encoded user information is supplied to the modulation units 20A, 20B, . . . , 20Z corresponding to the encoding units 18A, 18B, . . . , 18Z. The modulation units 20A, 20B, . . . , 20Z perform predefined operations on the supplied encoded user information to generate corresponding modulated user information, which is supplied to the multiplexing unit 22.

Upon receiving the corresponding modulated user information pieces from the modulation units 20A, 20B, . . . , 20Z, the multiplexing unit 22 multiplexes a predefined number of user information pieces in the received modulated user information pieces based on the multiplexing information received from the scheduler 12. Also, the multiplexing unit 22 multiplexes control channels supplied from the control channel generation unit 14 as well as the multiplexed user information pieces to generate a transmitted signal. This signal is transmitted through a RF transmitting circuit, a power amplifier, a duplexer and others (not shown).

According to the above arrangement, the downlink shared data channel information is generated with the optimal number of bits for transmitting the uplink shared data channel information based on one or both of the number of users and the traffic amount, resulting in a reduction in kinds of bit sizes.

[Second Embodiment]

Next, a communication control method according to the second embodiment of the present invention is described. This communication control method is implemented in a communication system including a base station according to the first embodiment of the present invention and a mobile station capable of communicating with the base station.

Figure 2:
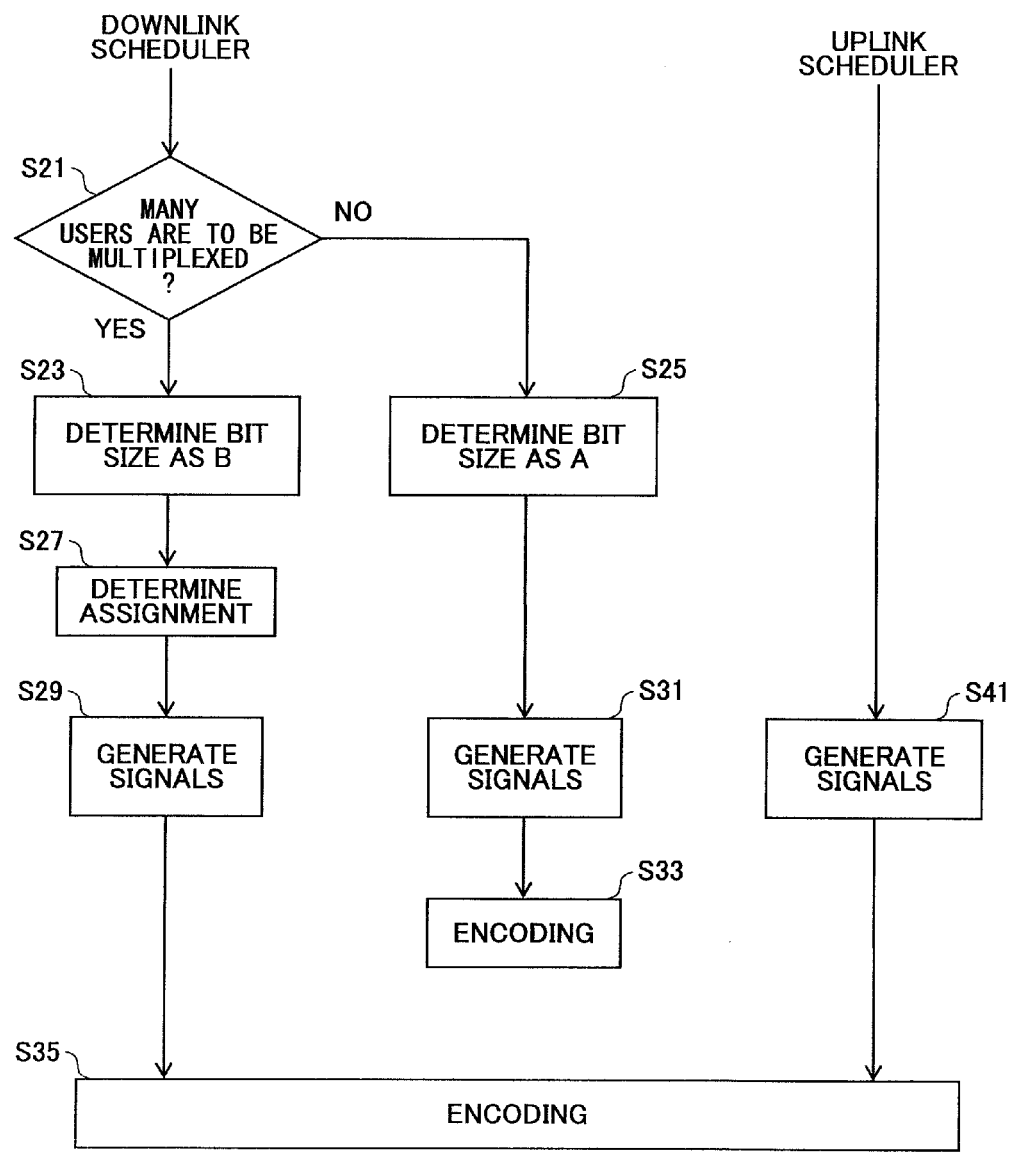
FIG. 2 is a flow chart illustrating a communication method according to an embodiment of the present invention.

FIG. 2 is a flow chart illustrating a communication control method according to the present invention. This method begins with step S21 where one or both of the number of users to be multiplexed (multiplexed number) and a user traffic amount is determined. In FIG. 2, only the number of users is illustrated. If it is determined that a small number of users are to be multiplexed (step S21:NO), for example, size A is selected as the number of bits used to transmit the downlink shared data channel information at step S25. Size A corresponds to an optimal number of bits for transmitting the downlink shared data channel information and may be equal to 80 bits, for example. If the user information is audio information, for example, the multiplexed number should be greater. In this case, it is preferred that a smaller number of bits be applied.

The above-mentioned 80 bits are simply illustrative, and 50 bits may be applied. Also, the bit size may be determined as in the above-mentioned scheduler 12 of the base station according to the first embodiment.

Next, a signal corresponding to the downlink shared data channel information is generated with bits corresponding to size A at step S31 and encoded at step S33.

On the other hand, if it is determined that a larger number of users are to be multiplexed (step S21: YES), for example, size B is selected as the number of bits at step S23. For example, size B may correspond to an optimal number of bits for transmitting the uplink shared data channel information having a smaller amount of information than the downlink shared data channel information and may be equal to 40 bits, for example. This bit size may be determined as in the scheduler 12 of the base station according to the first embodiment.

Next, at step S27, user assignment is performed, that is, it is determined which users are multiplexed. Next, at step S29, a signal corresponding to the downlink shared data channel information is generated with bits corresponding to size B.

At this time, for example, a "1" bit is added to the signal. This is for differentiating from the uplink shared data channel information as described below. In this case, the downlink shared data channel information within a control channel transmitted from the base station includes the same number of bits as the uplink shared data channel information, that is, size B, and thus a user could not identify these different information pieces based on only the number of bits. The additional "1" bit serves as an indicator for differentiating between them.

At step S29, a signal corresponding to the downlink shared data channel information is multiplexed with user information for the users determined to be multiplexed to generate a transmitted signal. The generated signal is encoded at step S35.

The signal corresponding to the uplink shared data channel information in the control channel is generated with bits corresponding to size B suitable for transmitting the uplink shared data channel information at step S41 and encoded together with the signal corresponding to the downlink shared data channel information and/or others at step S35. Also, if the same number of bits as the uplink shared data channel information is selected as the bit size for the downlink shared data channel information, for example, a "0" bit may be added to the uplink shared data channel information for easier differentiation.

According to the above communication control method, the number of bits used to transmit the downlink shared data channel information is determined based on the number of users and/or the traffic amount. For example, for a large number of users, a bit size suitable for transmitting the uplink shared data channel information having a smaller number of required bits may be selected as the bit size. In this case, since a number of bits suitable for transmitting the downlink shared data channel information do not have to be used, smaller kinds of bit sizes have to be applied for control channels. Thus, for a large number of users and/or a large traffic amount, a mobile station can identify different information pieces with reduced workload.

This international patent application is based on Japanese Priority Application No. 2007-211601 filed on Aug. 14, 2007, the entire contents of which are hereby incorporated by reference.

The invention claimed is:

1. A communication control method, comprising:
   determining a number of bits for transmitting downlink shared data channel information based on one or both of a number of users and a traffic amount; and
   generating a signal for the downlink shared data channel information to be transmitted with the determined number of bits,
   wherein the step of determining comprises determining whether to transmit the downlink shared data channel information in either a first number of bits suitable for transmitting the downlink shared data channel information or a second number of bits suitable for transmitting uplink shared data channel information, whether the first number of bits is greater than the second number of bits, and
   wherein, if the number of users is a small number of users, the step of determining comprises determining to transmit the downlink shared data channel information in the first number of bits suitable for transmitting the downlink shared data channel information, and if the number of users is a large number of users, the step of determining comprises determining to transmit the downlink shared data channel information in the second number of bits suitable for transmitting the uplink shared data channel information.

2. The communication control method as claimed in claim 1, wherein the first number of bits is determined based on at least one of resource block assignment information indicative of resource blocks assigned to the users, user information, and transport format information indicative of a data modulation scheme.

3. The communication control method as claimed in claim 1, wherein if the step of determining selects the second number of bits, the step of generating comprises adding information indicating that the downlink shared data channel information is transmitted with the second number of bits.

4. A base station, comprising:
   a scheduler configured to determine a number of bits for transmitting downlink shared data channel information based on one or both of a number of users and a traffic amount,
   wherein the scheduler determines whether to transmit the downlink shared data channel information in either a first number of bits suitable for transmitting the downlink shared data channel information or a second number of bits suitable for transmitting uplink shared data channel information, wherein the first number of bits is greater than the second number of bits, and
   wherein, if the number of users is a small number of users, the scheduler determines to transmit the downlink shared data channel information in the first number of bits suitable for transmitting the downlink shared data channel information, and if the number of users is a large number of users, the scheduler determines to transmit the downlink shared data channel information in the second number of bits suitable for transmitting the uplink shared data channel information.

5. The base station as claimed in claim 4, wherein the first number of bits is determined based on at least one of resource block assignment information indicative of resource blocks assigned to the users, user information, and transport format information indicative of a data modulation scheme.

6. The base station as claimed in claim 4, further comprising:
   a channel generation unit configured to receive the determined number of bits from the scheduler and if the incoming number of bits corresponds to the second number of bits, to add information indicating that the downlink shared channel information is transmitted with the second number of bits.

* * * * *